Jan. 11, 1927.
H. C. SALLAC
RESILIENT WHEEL
Filed Feb. 3, 1925   2 Sheets-Sheet 1
1,614,397
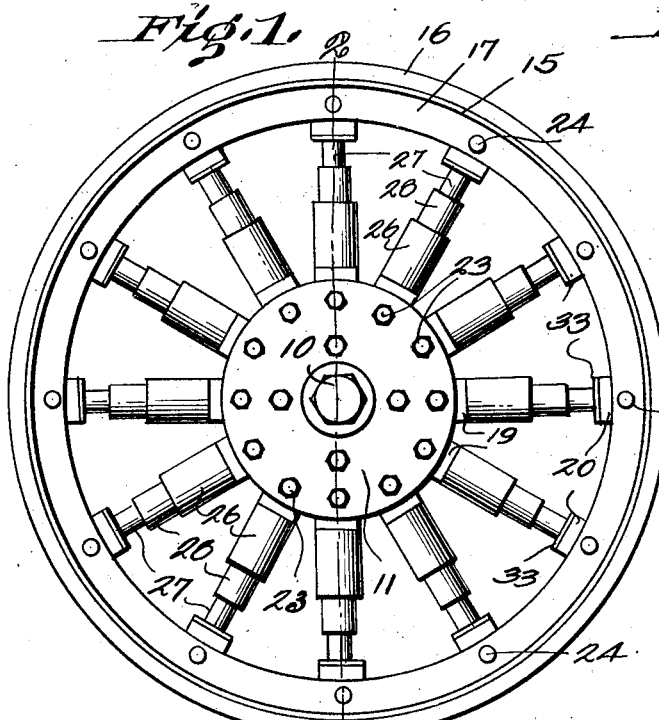
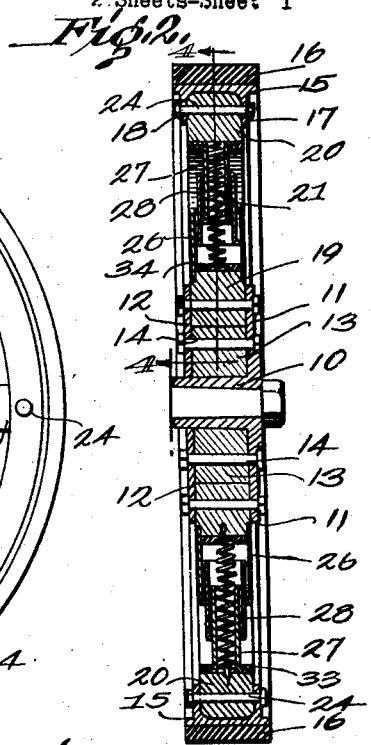
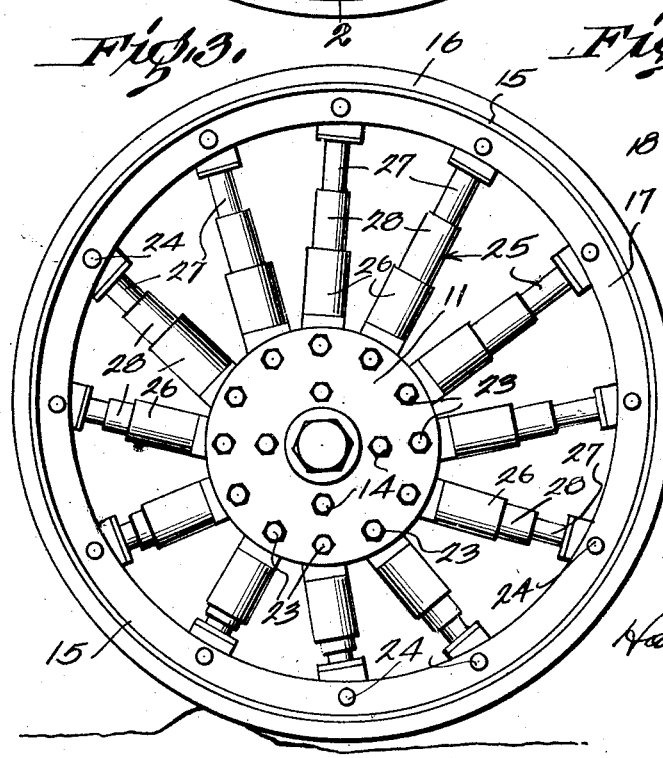
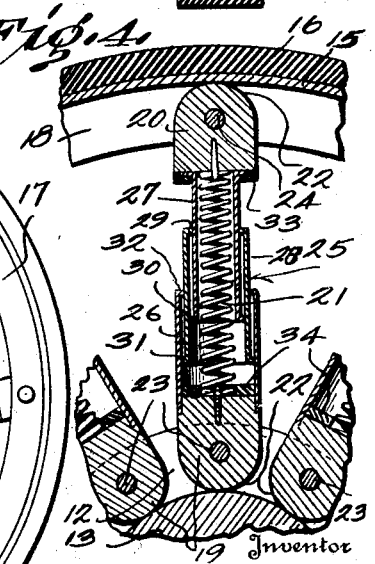
Inventor
Harry C. Sallac
Attorney Jan. 11, 1927.

H. C. SALLAC

RESILIENT WHEEL

Filed Feb. 3, 1925

Inventor

Harry C. Sallac

By

Attorney

Patented Jan. 11, 1927.

1,614,397

UNITED STATES PATENT OFFICE.

HARRY C. SALLAC, OF ST. LOUIS, MISSOURI.

RESILIENT WHEEL.

Application filed February 3, 1925. Serial No. 6,578.

The present invention relates to resilient wheels, and aims to provide a novel and improved device of that character, which will absorb shocks, jolts, and vibrations when the vehicle on which the wheels are mounted is traveling over rough ground, said resilient wheels not requiring pneumatic tires thereon which will consequently eliminate punctures and other tire trouble incident to the use thereof.

Another object of the invention is the provision of telescopic members having yieldable means arranged therein and attached to the rims and hubs of the wheels, said telescopic members excluding dust and other foreign matter from gaining access to the interior of the wheels.

It is also an object of the invention to provide resilient wheels of the kind indicated, which are simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a side elevation of my improved wheel,

Figure 2 is a section taken on line 2—2 of Figure 1,

Figure 5:
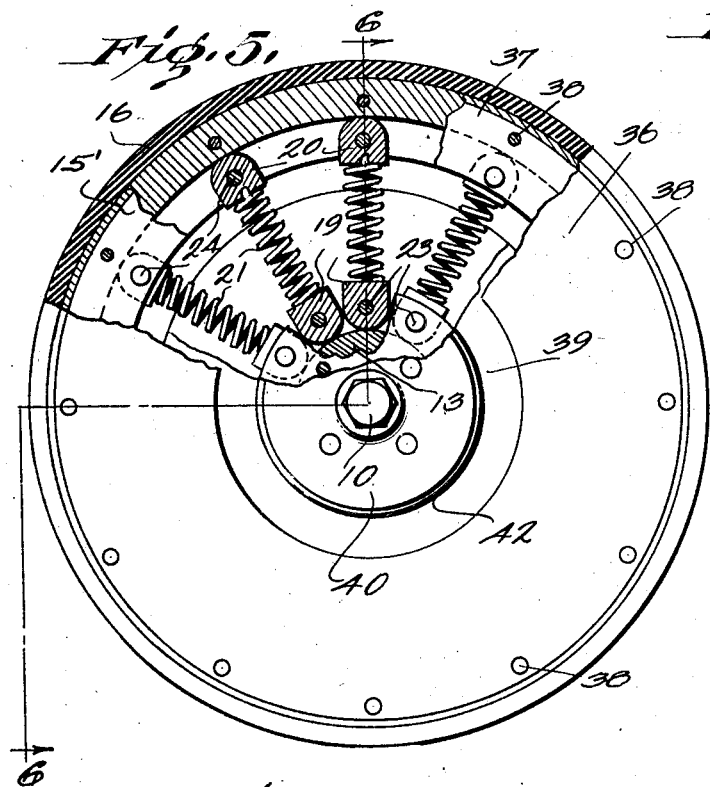
Figure 6:
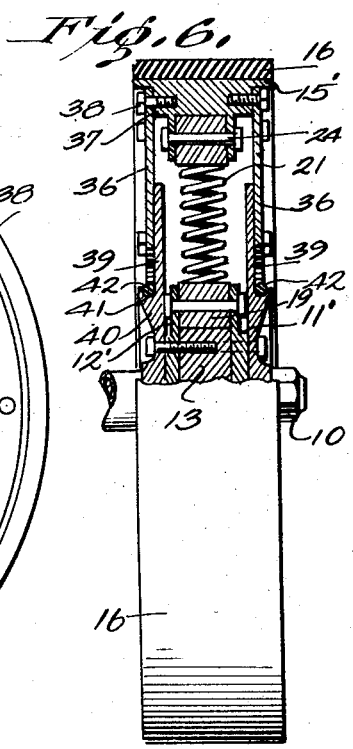
Figure 7:
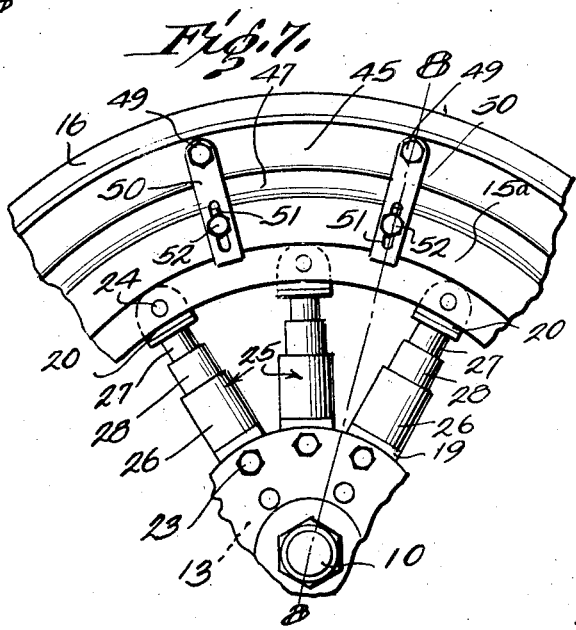
Figure 8:
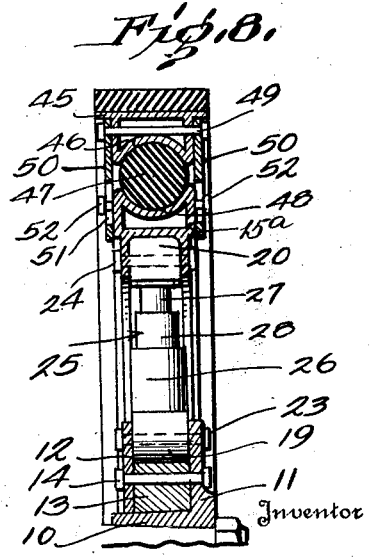

Figure 3 is a side elevation similar to Figure 1, but illustrating the position of the various parts of the wheel when the same engages an obstruction, Figure 4 is a section taken on line 4—4 of Figure 2, Figure 5 is an elevation of a slightly modified form, showing a portion of the wheel in section, Figure 6 is an edge view partly in section, the section being taken on line 6—6 of Figure 5, Figure 7 is a fragmentary elevation of a still further modified form, and Figure 8 is a section taken on line 8—8 of Figure 7.

In carrying out the invention, the numeral 10 designates the hub of my improved wheel as having a pair of annular side flanges 11 and 12 between which is secured a cylindrical member 13 by bolts 14, while the numeral 15 indicates a metallic rim having secured on its outer cylindrical surface a solid rubber tire 16, said rim having on its inner cylindrical surface a pair of inwardly directed annular flanges 17 and 18 spaced from each other.

Positioned between the flanges 11 and 12 of the hub structure 10 and the flanges 17 and 18 of the rim construction 15 are block shaped bearing members 19 and 20 respectively. Said block shaped members 19 and 20 are attached to the opposite ends of coil springs 21, which are arranged to act as both contractile and expansion springs for normally holding the hub 10 directly in the center of the rim 15. The bearing members 19 and 20 have their ends rounded as at 22 for engaging the outer cylindrical surface of the cylindrical member 13 and the inner cylindrical surface of the rim 15 respectively. Extending through the annular flanges 11 and 12 and the bearing blocks 19 are pins 23 for pivotally connecting said bearing blocks to the hub structure, while pins 24 extend through the flanges 17 and 18 of the rim construction and the bearing blocks 20 for pivotally connecting said blocks in a like manner to the rim. It will be noted that the rounded surfaces 22 of the bearing blocks will engage the cylindrical member 13 and the rim 15 when the coil springs 21 attached thereto are contracted, and that the pivot pins 23 and 24 will prevent the disengagement of the rounded surfaces 22 from the cylindrical member 13 and rim 15 when the coil springs are expanded. Thus it can be seen that a construction is provided which will normally hold the hub in direct center of the rim, as above referred to.

Attached to the bearing blocks 19 and 20 are telescopic members 25, comprising a series of sleeves arranged about and enclosing the coil springs 21. Said sleeves 25 are arranged of different sizes so that one may slide within another, the largest of which are attached to the bearing blocks 19 in a rigid manner, and being designated by the numeral 26, while the smallest of said sleeves are attached to the bearing blocks 20 in a rigid manner the same being indicated by the numeral 27. Positioned between the sleeves 26 and 27 are intermediate sleeves 28 having inwardly directed flanges 29 for contacting with outwardly directed flanges 30 carried by the inner end of the smallest sleeves 27 when said telescopic sleeves are in an extended position, while on the opposite ends of the intermediate sleeves 28 are outwardly directed flanges 31 for engaging the inwardly directed flanges 32 carried by the outer end of the sleeves 26, when in such an extended position. Positioned on the inner ends of the bearing blocks 20 and on the outer ends of the bearing blocks 19 are ring shaped rubber members 33 and 34 respectively for absorbing the shocks should said intermediate sleeves engage the bearing blocks when the springs are in a contracted position.

By referring to Figure 3 of the official drawings, it will be noted that when the rim of the wheel engages an obstruction in the road, the spokes arranged at the point where the obstruction is engaged by the rim will be contracted while the spring at the opposite side of the wheel will be expanded, and the spokes arranged at right angles to such point of contact are permitted to swing on the pivot pins 23 and 24, so that the hub 10 is free to move in any direction towards the rim, and thus absorb any shocks or vibration incident to the travel of the wheels over rough ground.

Referring to the form of my invention illustrated in Figures 5 and 6, it will be noted that a pair of annular plates 36 of ring shape construction are attached to shoulders 37, arranged on the rim 15′, by bolts 38, while attached to the outer side of the flanges 11′ and 12′ are a pair of ring shaped plates 39, arranged to engage the inner sides of the plates 36 and to snugly contact therewith at all times. On the opposite sides of the plates 39 are arranged projections 40 having annular grooves 41 therein for receiving cylindrical rubber members 42 that engage the inner edges of the ring shaped plates 36 when that side of the wheel is contracted. In this form of my invention, the telescopic sleeves 25 are eliminated and the ring shaped plates used to serve the same purpose, that is, for excluding dust and other foreign matter from entering the interior of the wheel.

In Figures 7 and 8 of my invention is illustrated a still further modified form, which includes an additional shock absorbing means. In this form, the solid rubber tire is not attached to the rim 15ª, but is arranged about an additional rim 45 having a cylindrical groove 46 therein arranged on the inner cylindrical surface thereof for receiving the outer portion of a yieldable member of cylindrical form and circular in cross section, said yieldable member being designated by the numeral 47. The rim 15ª has a cylindrical groove 48 provided on its outer cylindrical surface for engaging the inner portion of the yieldable member 47. Extending across the rim 45 at spaced intervals is a series of bolts 49 having pivotally connected to each end thereof a bar 50 which extends towards the center of the hub, said bars 50 having slots 51 arranged therein adjacent their inner ends through which lugs 52 carried by the rim 15ª extend. It will be noted that the yieldable member 47 is held between the cylindrical grooves 46 and 48 in the rims 45 and 15ª respectively, and that when an obstruction is engaged by the outer rim 45 the yieldable member 47 will be compressed at such point, the slots 51 in the bars 50 permitting such inward movement of the rim 45 towards the rim 15ª.

Having thus described my invention, what I claim as new is:

A wheel structure comprising a rim having an inner cylindrical surface, a hub having an outer cylindrical surface, a series of spokes interposed between the rim and the hub, each spoke consisting of end members, each end member having an arcuate outer end surface which bears directly against a cylindrical surface, the arcuate surface of the outer end member of the spoke bearing against the cylindrical surface of the rim, the arcuate surface of the inner end member of the spoke bearing against the cylindrical surface of the hub, resilient means interposed between the end members of the spoke and being under tension with a tendency to hold the arcuate surfaces of the end members of the spoke in close contact with the cylindrical surfaces of the rim and hub respectively, flange members carried by the rim and hub respectively and disposed against the opposite side surfaces of the end members of the spokes, and pivot bolts passing through the flange members and the end members of the spokes and holding the arcuate surfaces of the end members of the spokes in contact with the cylindrical surfaces of the rim and the hub.

In testimony whereof, I have affixed my signature.

HARRY C. SALLAC.